(12) United States Patent
Okabe et al.

(10) Patent No.: US 11,694,296 B2
(45) Date of Patent: Jul. 4, 2023

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Shinichi Okabe, Nagakute (JP); Hiroaki Sakurai, Nagoya (JP); Kazuaki Takemura, Nagoya (JP); Kengo Takeuchi, Ogaki (JP); Kaori Sakai, Tokyo-to (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 995 days.

(21) Appl. No.: 16/454,808

(22) Filed: Jun. 27, 2019

(65) Prior Publication Data
US 2020/0013136 A1  Jan. 9, 2020

(30) Foreign Application Priority Data

Jul. 3, 2018  (JP) .................. 2018-126927

(51) Int. Cl.
*G06Q 50/30* (2012.01)
*G06F 21/44* (2013.01)
*G06Q 10/0631* (2023.01)

(52) U.S. Cl.
CPC ........... *G06Q 50/30* (2013.01); *G06F 21/44* (2013.01); *G06Q 10/063114* (2013.01)

(58) Field of Classification Search
CPC ........... G06Q 50/30; G06Q 10/063114; G06Q 30/0208; G06F 21/44
See application file for complete search history.

(56) References Cited

U.S. PATENT DOCUMENTS

2014/0180773 A1* 6/2014 Zafiroglu ............. G08G 1/0112
 705/13
2016/0249181 A1* 8/2016 Taniguchi ............... H04W 4/44

FOREIGN PATENT DOCUMENTS

| JP | 2008-032569 A | 2/2008 |
|----|---------------|--------|
| JP | 2011-107088 A | 6/2011 |
| JP | 2013-069020 A | 4/2013 |
| JP | 2017-010291 A | 1/2017 |
| JP | 2017-062692 A | 3/2017 |
| JP | 2017149343    | * 8/2017 |

* cited by examiner

*Primary Examiner* — Marisol Figueroa
(74) *Attorney, Agent, or Firm* — Oliff PLC

(57) ABSTRACT

An information processing device includes a processor configured to detect whether or not a vehicle that is about to use a facility is under share ride by a plurality of persons, and permit the vehicle to use the facility or providing an economic merit associated with usage of the facility to the vehicle, when having detected that the vehicle is under share ride.

6 Claims, 10 Drawing Sheets

FIG. 5

| VEHICLE ID | OCCUPANT TERMINAL | NUMBER OF OCCUPANTS | SHARE RIDE/ NON-SHARE RIDE | USAGE PERMISSION /REFUSAL |
|---|---|---|---|---|
| M01 | U011,U012,U013 | 3 | SHARED | PERMITTED |
| M02 | U02 | 1 | NOT SHARED | REFUSED |
| M03 | U031,U032,U033,U034 | 4 | SHARED | PERMITTED |
| M04 | U041,U042 | 2 | SHARED | PERMITTED |
| M05 | ... | ... | ... | ... |

INFORMATION PROCESSING DEVICE AND INFORMATION PROCESSING METHOD

CROSS REFERENCE TO RELATED APPLICATION

This application claims the benefit of Japanese Patent Application No. 2018-126927, filed on Jul. 3, 2018, which is hereby incorporated by reference herein in its entirety.

BACKGROUND

Technical Field

The present disclosure relates to an information processing device and an information processing method.

Description of the Related Art

A traveling form in which a plurality of users share the same vehicle (ride sharing) has been recently widened. Reduction in the volume of traffic due to ride sharing is expected to provide an effect such as shortening of a traveling time, reduction in $CO_2$ emissions, and reduction of a traveling cost.

As a technology for alleviating traffic congestion, Patent document 1 discloses a vehicle guide system that efficiently alleviates traffic congestion in a particular road. In Patent document 1, a notification about vehicle guide information for guiding a vehicle, which is traveling on the upstream side of a congestion section, to drop in at a service area or to temporally exit through an exit interchange of a highway, is given to the vehicle. A privilege to receive a discount on the toll of the highway is given to the guided vehicle having followed the vehicle guide information.

CITATION LIST

Patent Document

[Patent document 1] Japanese Patent Laid-Open No. 2017-062692

Traffic congestion also can be alleviated by a promotion of ride sharing in which a plurality of persons share the same vehicle. However, it is difficult to promote ride sharing without a merit in using ride sharing. Accordingly, an object of the present disclosure is to preferentially treat a vehicle in which ride sharing is being carried out, and thereby, enhance a user's motivation to use ride sharing.

SUMMARY

A first aspect of the present disclosure is an information processing device including a processor configured to:
  detect whether or not a vehicle that is about to use a facility is under share ride by a plurality of persons; and
  permit the vehicle to use the facility or providing an economic merit associated with usage of the facility to the vehicle, when having detected that the vehicle is under share ride.

A second aspect of the present disclosure is an information processing method for causing a computer to execute:
  detecting whether or not a vehicle that is about to use a facility is under ride share by a plurality of users; and
  permitting the vehicle to use the facility or providing an economic merit associated with usage of the facility to the vehicle, when having detected that the vehicle is under ride share.

A third aspect of the present disclosure is a program for causing a computer to execute the information processing method according to the second aspect, or is a computer readable recording medium having the program non-temporarily stored therein.

According to the present disclosure, a vehicle in which ride sharing is being carried out is preferentially treated, whereby a user's motivation to use ride sharing can be enhanced.

BRIEF DESCRIPTION OF DRAWINGS

FIG. 5 is an example of usage management information table;

DESCRIPTION OF THE EMBODIMENTS

Although ride sharing is being spread, the popularity of ride sharing is currently not so high. If a user can receive, as a result of using ride sharing, a privilege such as a priority for using a facility or a discount on a facility fee, the user's motivation to use ride sharing is expected to be enhanced, whereby ride sharing is expected to be further popularized.

In view of this, the present embodiment provides an information processing device (a computer) that permits a share-ride vehicle, in which ride sharing is being carried out, to use a facility, or provides an economic merit associated with usage of the facility to the share-ride vehicle.

An information processing device according to the present embodiment detects whether or not a vehicle that is about to use a facility is shared by a plurality of users, and permits the user to use the facility or provides an economic merit associated with usage of the facility to the vehicle when having detected that the vehicle is under share ride.

Whether or not the vehicle is under share ride by a plurality of users, that is, whether or not the vehicle is under share ride can be detected through acquisition of the number of occupants in the vehicle. For example, when the number of occupants is two or more, or when the number of occupants excluding a user who has a family relationship is two or more, the vehicle is detected to be under share ride.

Examples of the facility include a commercial facility, a service area, and an event site. Examples of the usage of the facility include entry to a parking lot in the facility and entry to a priority lane in the facility. Further, examples of the permission to use the facility include a permission to use a convenient parking lot or parking frame exclusively for share-ride vehicles, and a permission to enter a priority lane. Examples of providing an economic merit associated with usage of the facility include providing a discount on a parking fee or a highway toll, offering a point, issuing a coupon, and raising a member status.

According to the present embodiment, a share-ride vehicle can receive various privileges such as a permission to use a facility and provision of an economic merit associated with usage of the facility. A share-ride vehicle can receive various privileges, whereby a user's motivation to use ride sharing is enhanced to promote use of ride sharing.

First Embodiment (Summary of System)

Figure 1:
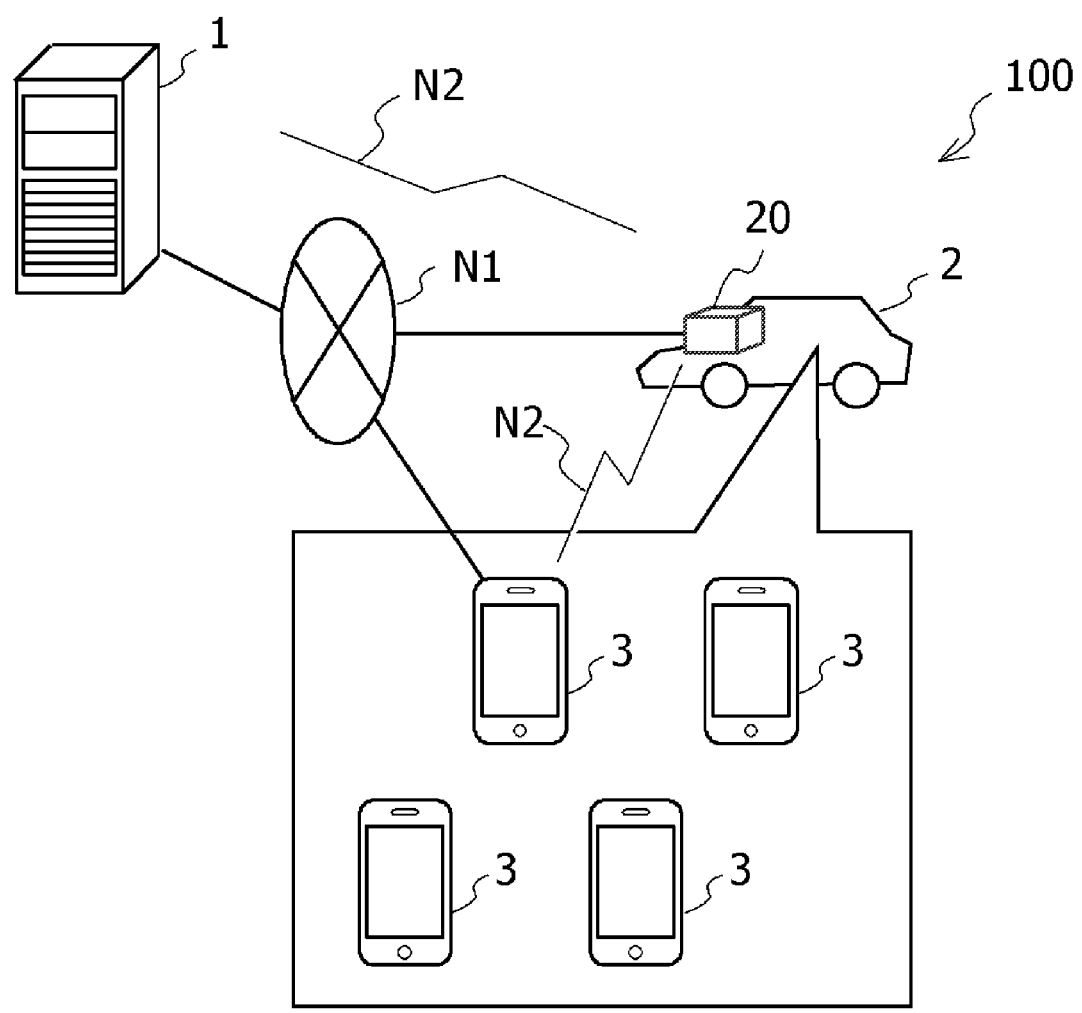
FIG. 1 is an example of a diagram illustrating the schematic configuration of a share-ride vehicle preferential treatment system according to a first embodiment.

FIG. 1 is a diagram illustrating the schematic configuration of a share-ride vehicle preferential treatment system 100 (hereinafter, referred to as system 100) according to a first embodiment. In the example in FIG. 1, the system 100 includes an information processing device 1, a vehicle 2, an on-vehicle terminal 20 installed in the vehicle 2, and terminals 3 which users who are riding the vehicle 2 have. The users who are riding the vehicle 2 are also referred to as occupants. The information processing device 1, the on-vehicle terminal 20, and the terminals 3 are connected to one another over a network N1. Note that the network N1 is a global public communication network such as the Internet, for example. A WAN (wide area network) or another communication network may be adopted therefor. Further, the on-vehicle terminal 20 is connected to the terminals 3 over a network N2 including short-distance radio communication, etc. Note that the information processing device 1 may be connected to the on-vehicle terminal 20 or the terminals 3 over the network N2 including short-distance radio communication and inter-vehicle communication.

The information processing device 1 detects whether or not the vehicle 2 that is about to use a facility is under share ride by a plurality of users. The information processing device 1 can obtain the number of occupants in the vehicle 2, by communicating with the on-vehicle terminal 20 or the terminals 3. The information processing device 1 detects whether or not the vehicle 2 is under share ride, based on the number of occupants. When having detected that the vehicle 2 is under share ride, the information processing device 1 permits the vehicle 2 to use the facility, or provides an economic merit associated with usage of the facility to the vehicle 2. Specifically, the information processing device 1 can give a permission to use a convenient parking lot or parking frame exclusively for share-ride vehicles, or a permission to enter a priority lane. Also, the information processing device 1 can provide, as an economic merit associated with usage of the facility, a discount on a parking fee, a highway toll, a facility fee, or the like, to the occupants in the vehicle 2 under share ride.

The on-vehicle terminal 20 can acquire the number of occupants in the vehicle 2, by communicating with the terminals 3 of users. The on-vehicle terminal 20 notifies the information processing device 1 about the acquired number of occupants in the vehicle 2. The on-vehicle terminal 20 may preliminarily store information about the terminal 3 of a user having a family relationship such that the user is excluded from the number of occupants. Further, the on-vehicle terminal 20 may manage a positional information history by acquiring positional information from the vehicle 2 and positional information from the terminals 3 of the users at a predetermined interval.

Each of the terminals 3 can notify the information processing device 1 or the on-vehicle terminal 20 that the user thereof is an occupant in the vehicle 2, by responding to a communication request from the information processing device 1 or the on-vehicle terminal 20.

(Device Configuration)

Figure 2:
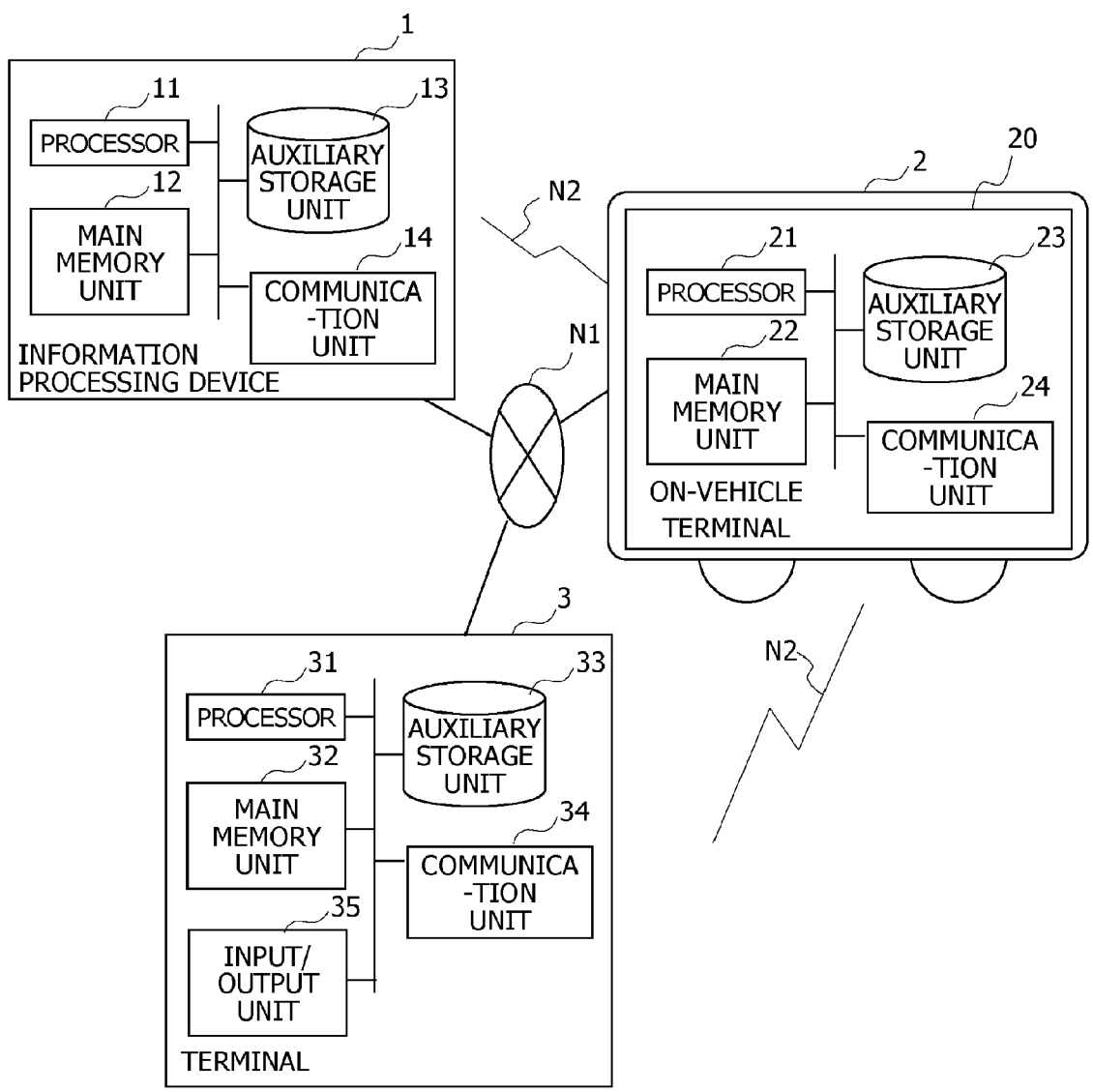
FIG. 2 is an example of a diagram illustrating a device configurations of an information processing device, an on-vehicle terminal, and terminals.

FIG. 2 is a diagram illustrating the device configurations of the information processing device, the on-vehicle terminal, and the terminals. The information processing device 1 is formed of a computer, a workstation, or the like. The computer or the like includes a processor 11 such as a CPU or a DSP, a main memory unit 12 such as a read only memory (ROM) or a random access memory (RAM), an auxiliary storage unit 13 such as an EPROM, a hard disk drive (HDD), or a removable medium, and a communication unit 14 for communicating with the on-vehicle terminal 20, the terminals 3, or other devices. Note that, for example, the removable medium is a flash memory such as a USB memory or an SD card, or is a disk recording medium such as a CD-ROM, a DVD disc, or a Blue-ray disc, for example. The auxiliary storage unit 13 has stored therein an operating system (OS), various programs, various tables, and the like, and can implement functional units for accomplishing predetermined purposes such as that described later, by loading a program stored in the auxiliary storage unit 13 to a work area in the main memory unit 12 and executing the program such that the constituent units are controlled through execution of the program. However, some or all of the functional units may be implemented by a hardware circuit such as an ASIC or FPGA. However, the information processing device 1 is not limited to a device implemented a single physical configuration, and may be formed of a plurality of computers that cooperate with one another.

The on-vehicle terminal 20 is a computer including a processor 21, a main memory unit 22, an auxiliary storage unit 23, and a communication unit 24. The processor 21, the main memory unit 22, the auxiliary storage unit 23, and the communication unit 24 are the same as the processor 11, the main memory unit 12, the auxiliary storage unit 13, and the communication unit 14 of the information processing device 1, and thus, an explanation thereof is omitted. The on-vehicle terminal 20 acquires the number of occupants in the vehicle 2 by performing short-distance communication with the terminals 3 over the network N2. The on-vehicle terminal 20 can specify, as the terminals 3 of occupants in the vehicle 2, the terminals 3 that are located within a range where communication therewith can be performed by short-distance radio communication, etc., for example. In addition, the on-vehicle terminal 20 can acquire the positional information about the vehicle 2 from a GPS device installed in the vehicle 2.

The terminal 3 is a computer including a processor 31, a main memory unit 32, an auxiliary storage unit 33, a communication unit 34, an input/output unit 35, and a positional information acquisition unit, and is typically a mobile computer such as a smartphone or a tablet PC. The processor 31, the main memory unit 32, the auxiliary storage unit 33, and the communication unit 34 are the same as the processor 11, the main memory unit 12, the auxiliary storage unit 13, and the communication unit 14 of the information processing device 1, and thus, an explanation thereof is omitted. The input/output unit 35 is means for receiving input operations from users, and presenting the details of communication from the information processing device 1 or the on-vehicle terminal 20, and is a touch panel or a liquid crystal display, for example. The positional information acquisition unit is typically a GPS (global positioning system) device.

(Functional Configuration)

Figure 3:
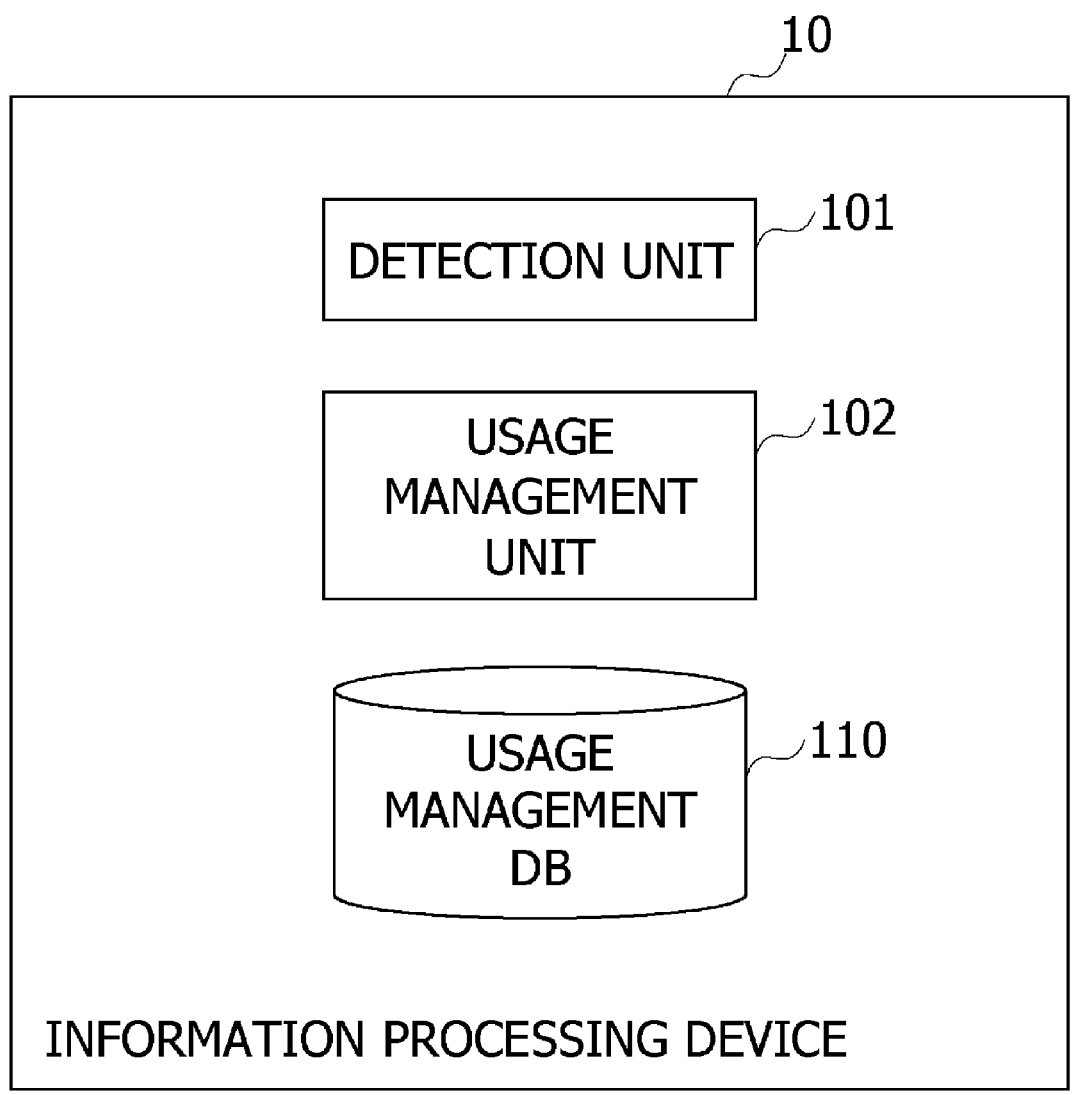
FIG. 3 is an example of a diagram illustrating the functional configuration of the information processing device.

FIG. 3 is a diagram illustrating the functional configuration of the information processing device. The processor 11 loads a program stored in the auxiliary storage unit 13 to the main memory unit 12, and executes the program so that the information processing device 1 implements the functions illustrated in FIG. 3. That is, the information processing device 1 includes a detection unit 101, a usage management unit 102, and a usage management database 110. The usage management database 110 is constructed by management of data stored in the auxiliary storage unit 13 through a database management system (DBMS) program which is executed by the processor 11. For example, the usage management database 110 is a relational database. These functional units will be described in detail below with reference to a flowchart. The processor 11 that executes the program to implement these functions corresponds to the "processor" of the present disclosure.

(Process)

[Share-Ride Vehicle Preferential Treatment Process]

Figure 4:
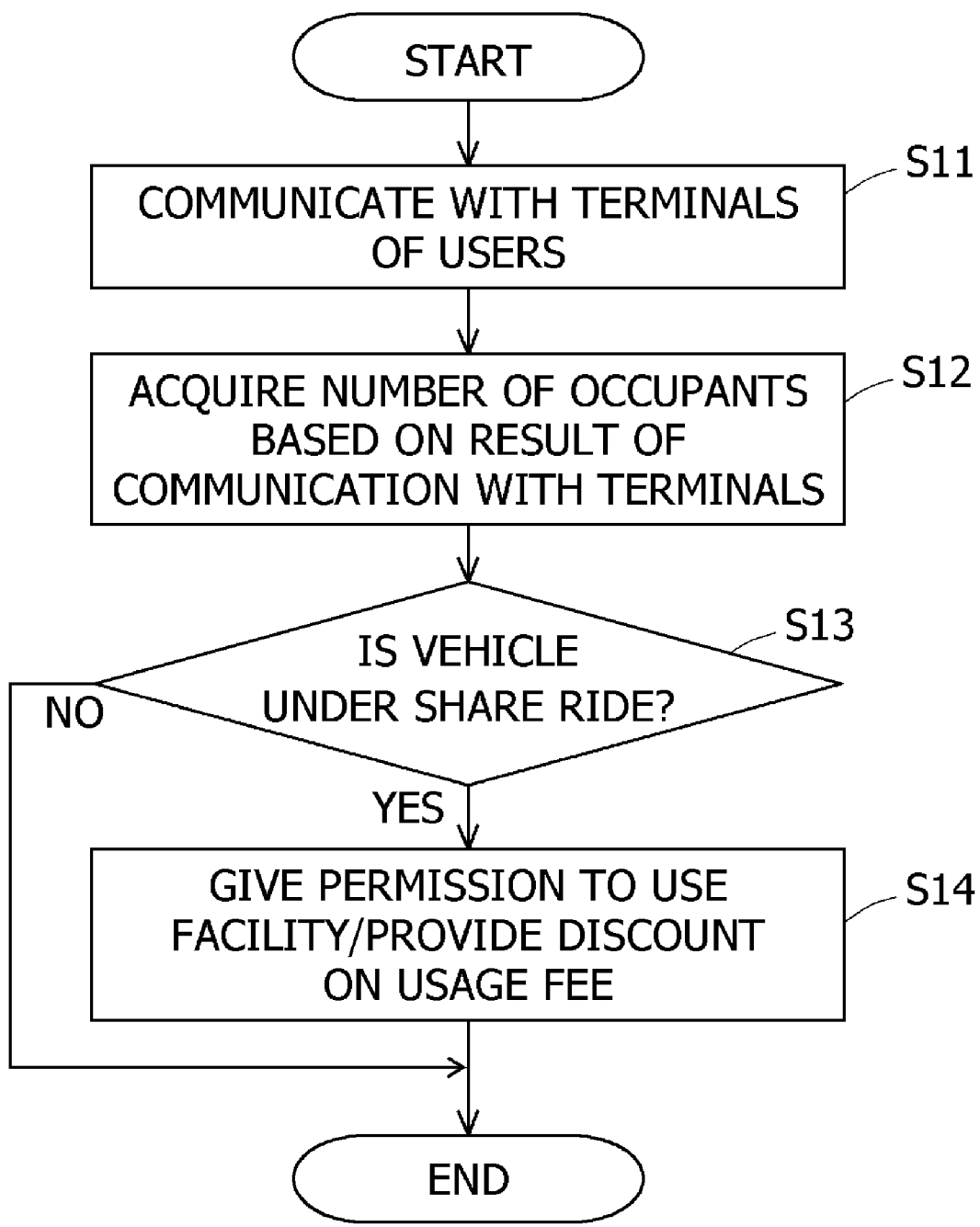
FIG. 4 is an example of a flowchart illustrating the flow of a share-ride vehicle preferential treatment process.

FIG. 4 is a flowchart illustrating the flow of a share-ride vehicle preferential treatment process. The share-ride vehicle preferential treatment process illustrated in FIG. 4, includes detecting whether or not the vehicle 2 that is about to use a facility is under share ride by a plurality of users, and preferentially treating the vehicle 2 when having detected that the vehicle 2 is under share ride. A process for preferentially treating the vehicle 2, includes permitting the vehicle 2 to use the facility or providing an economic merit associated with usage of the facility to the vehicle 2. The process illustrated in FIG. 4 is executed by the information processing device 1 that is positioned at a distance at which short-distance communication or inter-vehicle communication with the vehicle 2 can be performed and that manages usage of the facility, for example. The share-ride vehicle preferential treatment process is started upon reception, at the information processing device 1, of a notification about a request to use the facility from the vehicle 2.

At step S11, the detection unit 101 performs short-distance communication with the vehicle 2 and the terminals 3 of the users over the network N2. The detection unit 101 may output a communication request by broadcasting, for example.

At step S12, the detection unit 101 can acquire the number of occupants, based on the number of responses from the terminals 3. When the owners of a plurality of the terminals 3 specified as occupants have a family relationship, the detection unit 101 may exclude the owners of the terminals 3 having a family relationship from the number of occupants. Who is an owner of each of the terminals 3 and which owners are in a family relationship may be preliminarily stored as information in the information processing device 1, or may be determined through a query to an external server.

At step S13, the detection unit 101 determines whether or not the vehicle 2 is under share ride. The detection unit 101 can determine that the vehicle 2 is under share ride when the number of occupants is two or more, and determine that the vehicle 2 is not under share ride when the number of occupants is not two or more. When the vehicle 2 is under share ride (S13: Yes), the process proceeds to S14. When the vehicle 2 is not under share ride (S13: No), the share-ride vehicle preferential treatment process is ended. Note that the share ride may be recognizable from the outside when the vehicle 2 is determined to be under share ride. For example, a lamp set on the exterior of the vehicle may be lit or a display set on the exterior of the vehicle may display that the vehicle is under share ride.

At step S14, the usage management unit 102 can permit the vehicle 2 that is under share ride, to use the facility or provide an economic merit such as a discount on a fee associated with usage of the facility to the vehicle 2. The usage management unit 102 can give a permission to use the facility by opening a gate for an entry to a parking lot the usage of which is limited to the share-ride vehicle 2, for example. Further, the usage management unit 102 can provide an economic merit for giving a discount on a toll fee when the share-ride vehicle 2 passes through an ETC gate in order to use a highway.

The usage management unit 102 may store, in the usage management database 110, usage management information related to usage of the facility. Note that the usage management database 110 is constructed in the auxiliary storage unit 13 of the information processing device 1, but is not limited to this construction. The usage management database 110 may be constructed in another computer connected to the information processing device 1 over the network N1.

Here, usage management information stored in the usage management database 110 will be described with reference to FIG. 5. FIG. 5 is a diagram illustrating an example of the usage management information table. The usage management information table is a table for managing information about usage of the facility for each vehicle 2. The usage management information table includes a vehicle ID field, an occupant terminal field, a number-of-occupants field, a share ride/non-share ride field, and a usage permission/refusal field. The vehicle ID corresponds to the "vehicle identification information".

In the vehicle ID field, the vehicle ID is stored. The vehicle ID is an ID for identifying the vehicle 2, and is acquired from the vehicle 2 that is about to use the facility. For example, when acquiring the number of occupants in the vehicle 2, the detection unit 101 can acquire the vehicle ID from the on-vehicle terminal 20 of the vehicle 2, and store the vehicle ID in the vehicle ID field.

In the occupant terminal field, information for identifying the terminals 3 of users who are riding the vehicle 2 is stored. For example, at step S11, the detection unit 101 can acquire the information for identifying the terminals 3 together with responses from the terminals 3 to a communication request, and store the information in the occupant terminal field. In FIG. 5, IDs "U011", "U012", "U013" of three terminals 3 are indicated as information for identifying the terminals 3 of users who are riding the vehicle 2 having a vehicle ID "M01". The information stored in the occupant terminal field are not limited to the example in FIG. 5, and may be the telephone numbers or e-mail addresses of the terminals 3, for example. Note that the detection unit 101 may refrain from storing, in the occupant terminal field, the identification information about the terminal 3 having a family relationship.

In the number-of-occupants field, the number of occupants riding in the vehicle 2 is stored. The detection unit 101 can store, in the number-of-occupants field, the number of occupants acquired at step S12, for example. Note that the detection unit 101 may exclude the owner of the terminal 3 having the family relationship from the number of occupants.

In the share ride/non-share ride field, a determination result about whether or not the vehicle 2 that is about to use the facility is under share ride is stored. For example, when having determined that the vehicle 2 is under share ride at step S13, the detection unit 101 stores "shared" in the share ride/non-share ride field. When having determined that the vehicle 2 is not under share ride, the detection unit 101 stores "not shared" in the share ride/non-share ride field.

In the usage permission/refusal field, information about whether or not to permit the vehicle 2 to use the facility is stored. For example, when having permitted the vehicle 2 to use the facility at step S14, the detection unit 101 stores "permitted" in the usage permission/refusal field. When having not permitted the vehicle to use the facility, the detection unit 101 stores "refused" in the usage permission/refusal field.

Note that information stored in the usage management information table is not limited to the example indicated in FIG. 5, and addition, change, or deletion of the fields can be made, as appropriate. For example, a field for storing information about an economic merit associated with usage of the facility, or specifically, information about a discount on the fee may be added to the usage management information table.

(Advantageous Effects Provided by First Embodiment)

According to the present embodiment, a user using ride sharing can receive various privileges to use a convenient parking lot or parking frame exclusively for share-ride vehicles, or to receive a discount on a facility fee. If it gets to be well known that various privileges can be received as a result of usage of ride sharing, the popularity of ride sharing is expected to be enhanced and a user's motivation to use ride sharing is also expected to be enhanced. Increase of the number of facilities that preferentially treat share-ride vehicles leads to the further promotion of usage of ride sharing.

<Modifications>

(Modifications of Share-ride Determination Process)

The share ride determination process (step S11 to step S13 in FIG. 4) of the first embodiment for determining whether or not the vehicle 2 is under share ride is merely one example. The process is not particularly limited to a specific method as long as whether or not the vehicle 2 is under share ride can be determined (detected). Hereinafter, modifications of the share-ride determination process will be described on the basis of FIGS. 6 to 10. In each of the modifications described below, the information processing device 1 may detect whether or not the vehicle 2 is under share ride, by arbitrarily combining a detection method of the modification with the detection method of the first embodiment and the detection methods of the other modifications. In the modifications, an explanation of a device configuration and a process identical to those of the first embodiment will be omitted, and the difference from the first embodiment will be mainly described.

(First Modification)

In the first embodiment, the information processing device 1 detects whether or not the vehicle 2 is under share ride by acquiring the number of occupants in the vehicle 2 through short-distance communication with the terminals 3 of users. In contrast, in a first modification, the information processing device 1 determines whether or not the vehicle 2 is under share ride by acquiring the number of occupants in the vehicle 2 from an external vehicle management server 4 that manages the vehicle 2.

Figure 6:
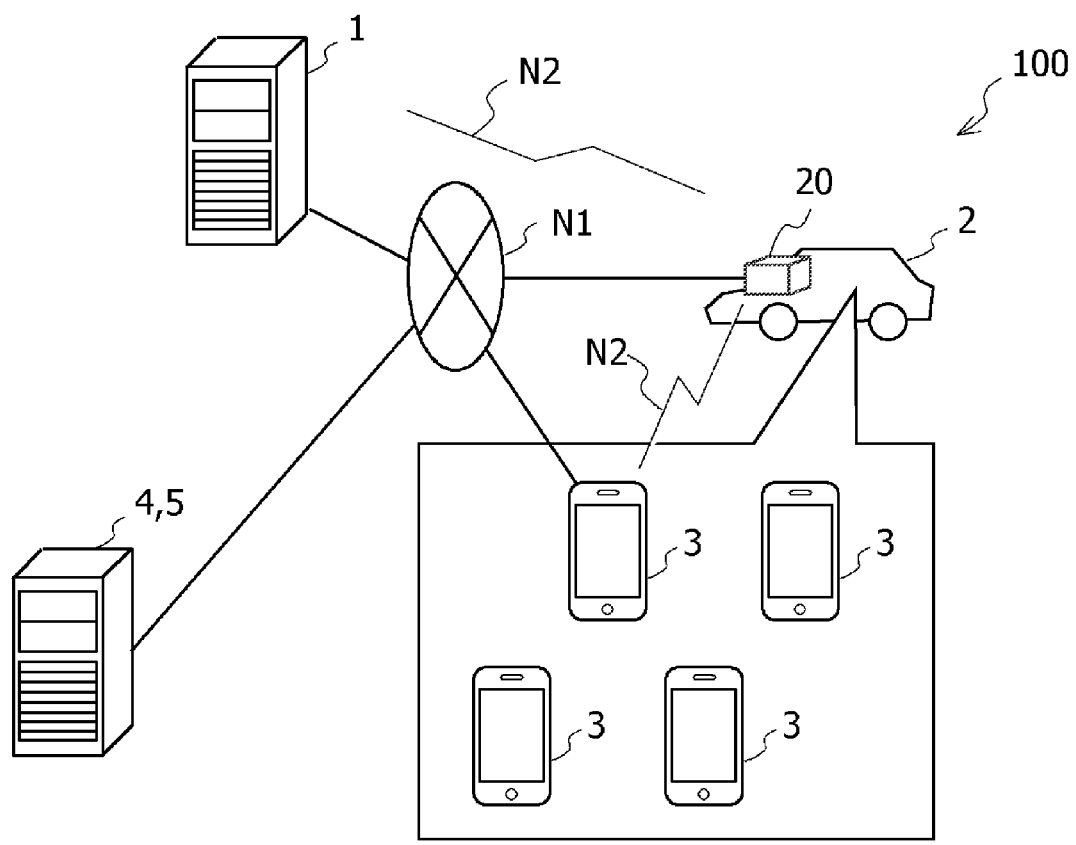
FIG. 6 is an example of a diagram illustrating the schematic configuration of a share-ride vehicle preferential treatment system according to modifications.

FIG. 6 is a diagram illustrating the schematic configuration of a share-ride vehicle preferential treatment system according to the modifications. The share-ride vehicle preferential treatment system 100 according to the modifications has a configuration the same as that of the system 100 illustrated in FIG. 1, and is connected to the external vehicle management server 4 over the network N1.

The vehicle management server 4 is a computer having a device configuration the same as that of the information processing device 1. The vehicle management server 4 can preliminarily store, in an auxiliary storage device thereof, information about the vehicle 2 to be used for ride share. The information about the vehicle 2 may include not only the vehicle ID for identifying the vehicle 2, but also the ID, the name, the contact information, etc., of the owner of the vehicle 2, for example. The vehicle management server 4 can receive information about the number of occupants acquired by the on-vehicle terminal 20, and manage the number of occupants in association with the vehicle ID.

The vehicle management server 4 receives an inquiry as to information about the vehicle 2 from the information processing device 1. In this case, by using the vehicle ID acquired from the on-vehicle terminal 20, the information processing device 1 can make the inquiry as to the information about the vehicle 2 to the vehicle management server 4. Alternatively, by reading the number plate of the vehicle 2 and using, as the vehicle ID, a vehicle number displayed on the number plate, the information processing device 1 may make the inquiry to the vehicle management server 4. The vehicle management server 4 transmits information corresponding to the inquiry to the information processing device 1.

Figure 7:
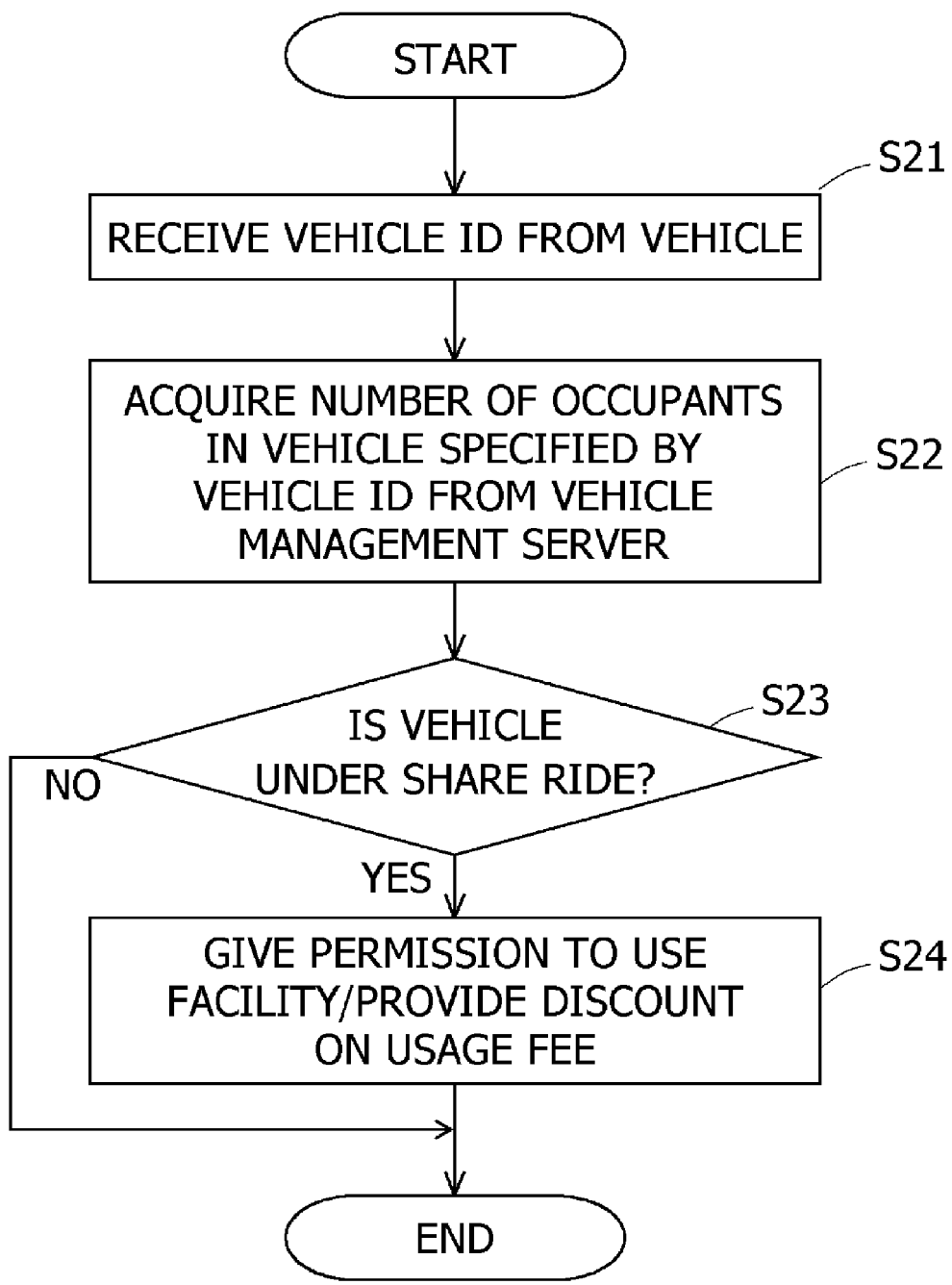
FIG. 7 is an example of a flowchart illustrating the flow of a share-ride vehicle preferential treatment process according to the first modification.

FIG. 7 is a flowchart illustrating the flow of a share-ride vehicle preferential treatment process according to the first modification. In the share-ride vehicle preferential treatment process illustrated in FIG. 7, the information processing device 1 detects whether or not the vehicle 2 is under share ride, by acquiring the number of occupants in the vehicle 2 from the vehicle management server 4 without communicating with the terminals 3 of users.

At step S21, the detection unit 101 receives the vehicle ID from the vehicle 2 that is about to use the facility. For example, the vehicle ID may be preliminarily stored in the on-vehicle terminal 20 such that the detection unit 101 can receive the vehicle ID from the on-vehicle terminal 20. In this case, the vehicle ID to be stored in the on-vehicle terminal 20 is identical to the vehicle ID that is managed by the vehicle management server 4.

At step S22, the detection unit 101 inquires the vehicle management server 4 about the number of occupants in the vehicle 2 with use of the vehicle ID received at step S21. By receiving a response from the vehicle management server 4, the detection unit 101 can acquire the number of occupants in the vehicle 2. At step S23, the detection unit 101 detects whether or not the vehicle 2 is under share ride in the same manner as that performed at step S13 indicated in FIG. 4. At step S24, the usage management unit 102 permits the vehicle 2 to use the facility or provides an economic merit, such as a discount on the fee, associated with usage of the facility to the vehicle 2, in the same manner as that performed at step S14 indicated in FIG. 4.

In the first modification, the information processing device 1 can acquire the information for determining whether or not the vehicle 2 is under share ride from the external vehicle management server 4 without communicating with the terminals 3 of users.

(Second Modification)

In the first modification, the information processing device 1 detects whether or not the vehicle 2 is under share ride, by acquiring the number of occupants in the vehicle 2 from the external vehicle management server 4 that manages the vehicle 2. In contrast, in a second modification, the information processing device 1 detects whether or not the vehicle 2 is under share ride, by acquiring the number of occupants in the vehicle 2 from a share-ride management server 5 that manages vehicle share ride.

As illustrated in FIG. 6, the share-ride vehicle preferential treatment system 100 according to the second modification has a configuration the same as that of the system 100 illustrated in FIG. 1, and is connected to the external share-ride management server 5 over the network N1.

The share-ride management server 5 is a computer having a device configuration the same as that of the information processing device 1. The share-ride management server 5 provides an application (hereinafter, referred to as predetermined application) for mediating (matching) between users who desire share ride, for example. The share-ride management server 5 receives registration of user information from users using the predetermined application. The registered user information is stored in an auxiliary storage device of the share-ride management server 5. The user information includes user IDs for identifying the users during use of the predetermined application, for example. Further, the share-ride management server 5 matches users who desire share ride, and stores, in the auxiliary storage device thereof, share-ride information about the matched users and a vehicle to be used for share ride. The share-ride information may include information to be used for detection of whether or not the vehicle 2 is under share ride. The share-ride information includes identification information about the vehicle 2 to be used for share ride, and the number of occupants in the vehicle 2, for example. Note that the number of occupants in the vehicle 2 may be the number of occupants having no family relationship.

Figure 8:
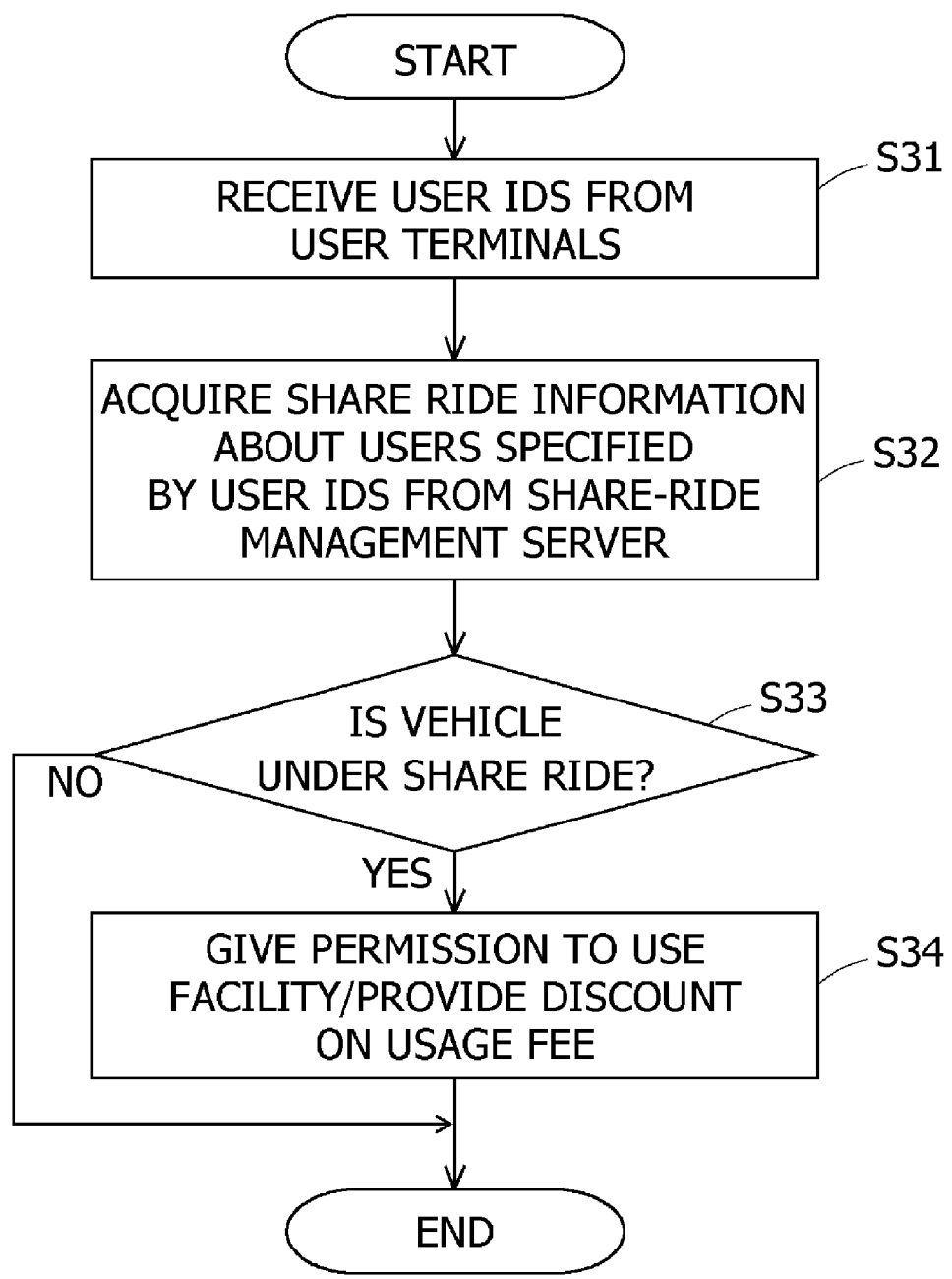
FIG. 8 is an example of a flowchart illustrating the flow of a share-ride vehicle preferential treatment process according to the second modification.

FIG. 8 is a flowchart illustrating the flow of a share-ride vehicle preferential treatment process according to the second modification. In the share-ride vehicle preferential treatment process indicated in FIG. 8, whether or not the vehicle 2 is under share ride is detected, by acquisition of the share-ride information from the share-ride management server 5.

At step S31, the detection unit 101 receives the user IDs from the terminals 3 of users. The user IDs are those having been preliminarily registered in order to use a predetermined application, for example.

At step S32, the detection unit 101 acquires share-ride information about the vehicle 2 from the share-ride management server 5, with use of the user IDs received at step S21. The share-ride information may include information as to whether or not the vehicle 2 which the users specified by the user IDs are riding is under share ride. In this case, at step S33, the detection unit 101 can detect whether or not the vehicle 2 is under share ride, based on the share-ride information. Further, when the share-ride information includes information about the number of occupants in the vehicle 2, the detection unit 101 can determine whether or not the vehicle 2 is under share ride at step S33, in the same manner as that performed step S13 indicated in FIG. 4. The process at step S34 is identical to the process at step S14 indicated in FIG. 4.

In the second modification, the information processing device 1 can acquire the information for determining whether or not the vehicle 2 is under share ride from the external share-ride management server 5 without communicating with the terminals 3 of the users. Moreover, by sharing the share-ride information with the predetermined application, the detection unit 101 can easily detect whether or not the vehicle 2 is under share ride. In addition, by sharing the information about the users registered in the predetermined application, the usage management unit 102 easily provides an economic merit, such as a discount on the fee, associated with usage of the facility.

(Third Modification)

In a third modification, the information processing device 1 detects whether or not the vehicle 2 is under share ride, by transmitting different codes to the terminals 3 of users who are riding the vehicle 2, and verifying authentication information created from the codes.

Figure 9:
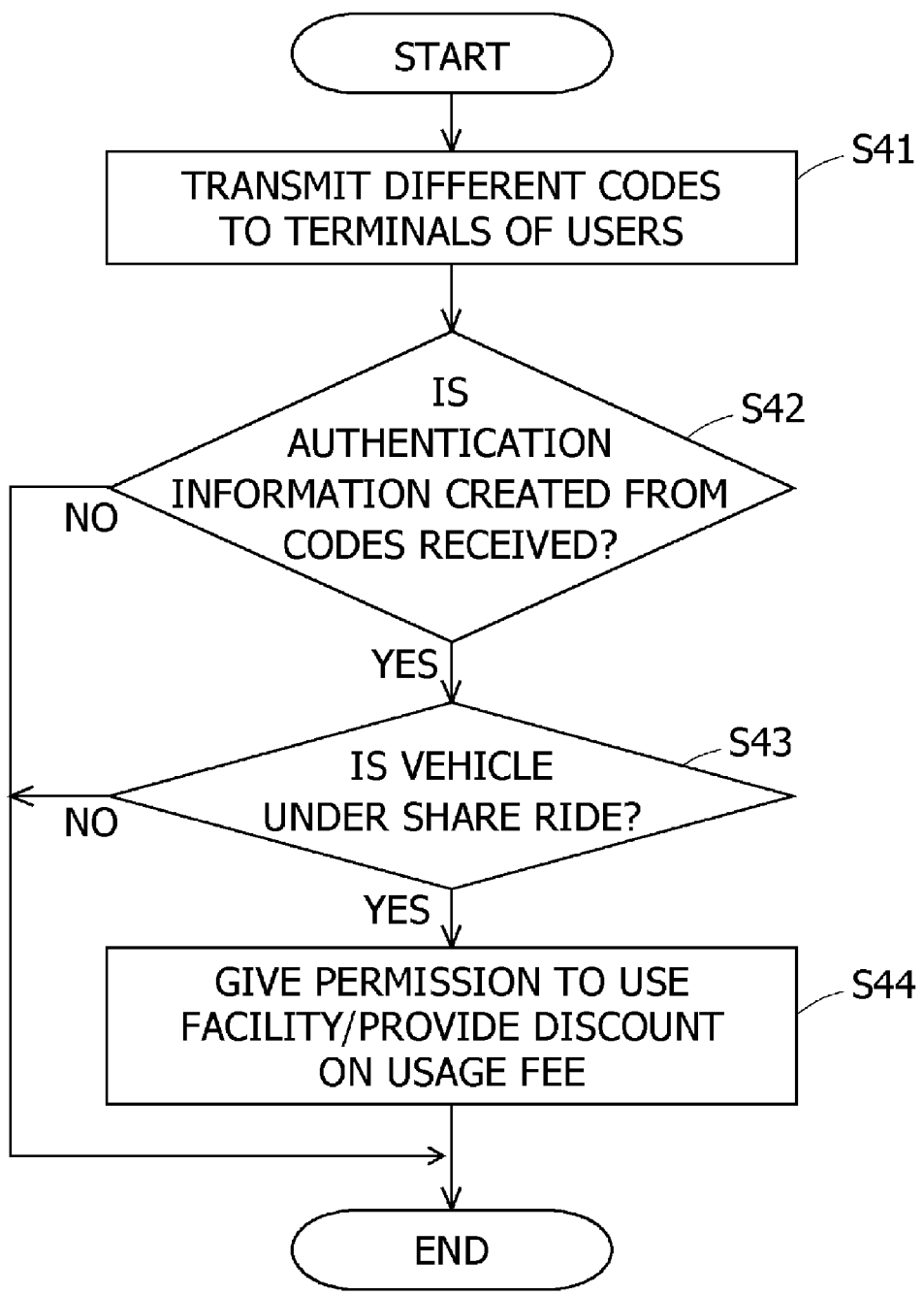
FIG. 9 is an example of a flowchart illustrating the flow of a share-ride vehicle preferential treatment process according to the third modification.

FIG. 9 is a flowchart illustrating the flow of a share-ride vehicle preferential treatment process according to the third modification. In the share-ride vehicle preferential treatment process indicated in FIG. 9, different codes are transmitted to the terminals 3 of the occupants, and authentication information created from the codes is verified, whereby a permission to use the facility is given or an economic merit associated with usage of the facility is provided.

At step S41, the detection unit 101 transmits different codes to the terminals 3 of users. The detection unit 101 outputs communication requests to the terminals 3 of users, and transmits different codes to the different terminals 3 from which the responses have been returned. The detection unit 101 may acquire, from the predetermined application, the transmission destination for the terminals 3 of the users who are riding the vehicle 2. The detection unit 101 stores, in the usage management database 110, information about the codes transmitted to the terminals 3.

The terminal 3 (hereinafter, referred to as representative terminal 3) of a representative person in the share-ride vehicle 2 first receives the codes transmitted to the terminals 3 of the users, and creates authentication information from the codes. The expression that the representative terminal 3 receives the codes, includes a case where the users manually input the codes, and a case where the codes are automatically shared among the terminals 3 through the predetermined application. The authentication information is created by connecting codes formed of characters or numerics, for example. For example, a two-dimensional code may be used as the authentication information.

Next, the representative terminal 3 creates the authentication information. Examples of a method for creating the authentication information include the following two methods.

(Method 1)

In a method 1, the information processing device 1 transmits, to the representative terminal 3, the codes transmitted to the terminals 3. When receiving the codes from the terminals 3, the representative terminal 3 verifies the correctness of the codes. When verification of the code received from any one of the terminals 3 fails, the representative terminal 3 notifies the information processing device 1 that no authentication information has been created, without creating authentication information.

(Method 2)

In a method 2, the representative terminal 3 receives the codes from the terminals 3, creates authentication information without verifying the correctness of the codes, and transmits the authentication information to the information processing device 1.

At step S42, the detection unit 101 determines whether or not the authentication information created from the codes transmitted at step S41 is received. The authentication information is transmitted from the terminal 3 of a representative person or, for example, the driver of the share-ride vehicle 2 to the information processing device 1 through short-distance communication, inter-vehicle communication, or the like. In addition, when the authentication information is a two-dimensional code, the driver may put, above a sensor provided to the information processing device 1, the two-dimensional code displayed on a screen of the representative terminal 3 so that the detection unit 101 receives the authentication information. When the detection unit 101 receives the authentication information (S42: Yes), the process proceeds to S43. When the detection unit 101 does not receive the authentication information (S42: No), that is, when the authentication information is not created by the aforementioned method 1, the representative terminal 3 is considered to have failed to verify authentication information so that the share-ride vehicle preferential treatment process is ended.

At step S43, the detection unit 101 determines whether or not the vehicle 2 is under share ride, based on the authentication information received at step S42. For example, from the codes having been sent to the terminals 3 at step S41, the detection unit 101 creates authentication information in the same manner as that at the representative terminal 3. When the created authentication information matches the authentication information received from the representative terminal 3, the detection unit 101 detects that the vehicle 2 is under share ride. When the vehicle 2 is under share ride (S43: Yes), the process proceeds to S44. When the vehicle 2 is not under share ride (S43: No), the share-ride vehicle preferential treatment process is ended. The process at step S44 is identical to the process at step S14 indicated in FIG. 4.

In the third modification, the information processing device 1 can detect whether or not the vehicle 2 is under share ride, by transmitting different codes to the terminals 3 of the users who are riding the vehicle 2, and verifying authentication information created from the codes by the representative terminal 3. By verifying the authentication information, the information processing device 1 can precisely detect whether or not share ride is being carried out.

(Fourth Modification)

In a fourth modification, the information processing device 1 detects whether or not the vehicle 2 is under share ride, based on positional information about the vehicle 2 and the terminals 3. The information processing device 1 can acquire the positional information about the vehicle 2 and the terminals 3 from the vehicle management server 4, for example. The vehicle management server 4 can manage the positional information history of the vehicle 2, by receiving, at a predetermined time interval, positional information acquired by means of the GPS device installed in the vehicle 2. The vehicle management server 4 may acquire not only the positional information about the vehicle 2 but also the positional information about the terminals 3 of the users, and manage the histories thereof. Alternatively, the positional information histories of the vehicle 2 and the terminals 3 may be managed by the on-vehicle terminal 20.

Figure 10:
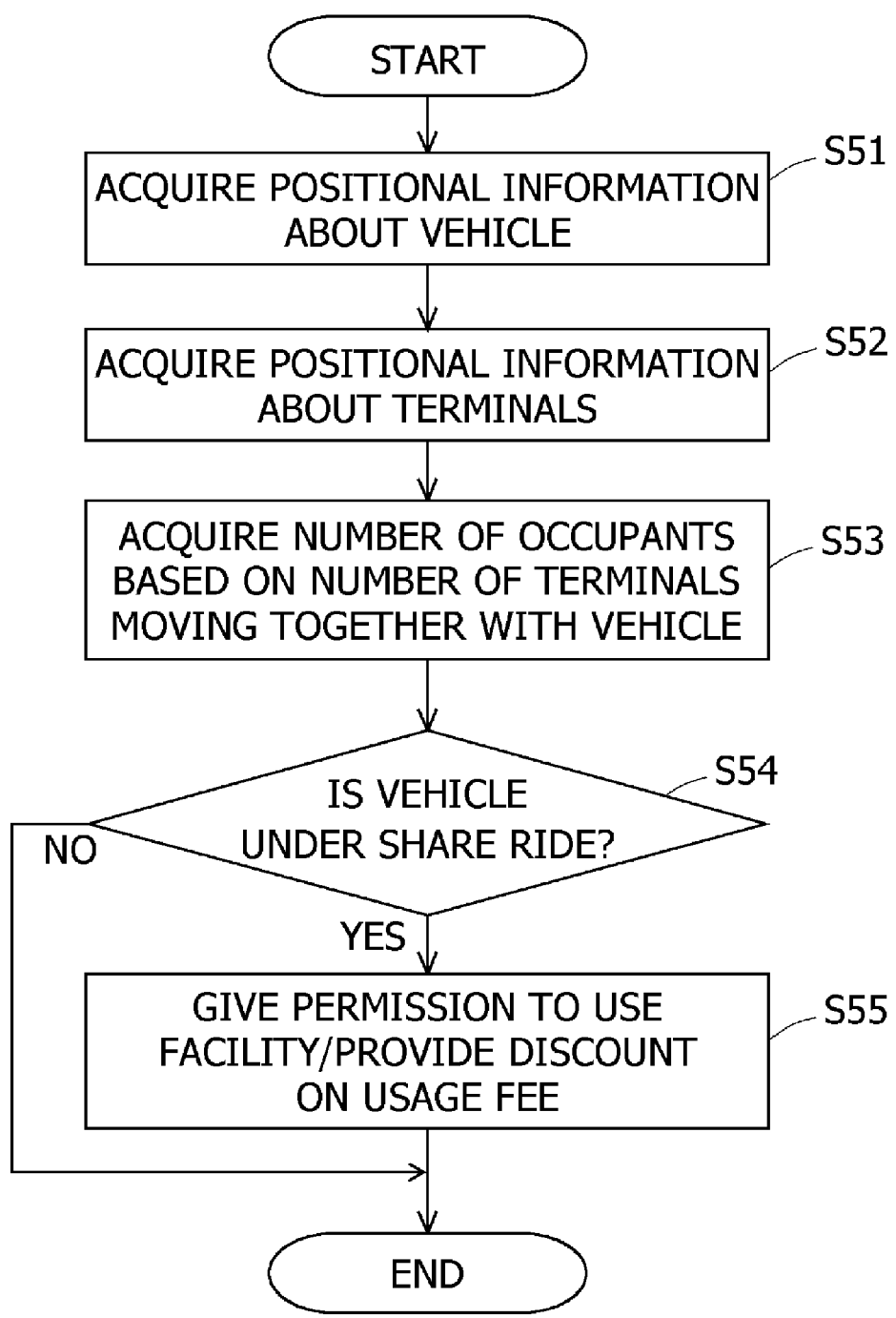
FIG. 10 is an example of a flowchart illustrating the flow of a share-ride vehicle preferential treatment process according to the fourth modification.

FIG. 10 is a flowchart illustrating the flow of a share-ride vehicle preferential treatment process according to the fourth modification. In the share-ride vehicle preferential treatment process indicated in FIG. 10, the positional information about the vehicle 2 and the terminals 3 is acquired, and the number of occupants is acquired on the basis of the number of the terminals 3 that are moving together with the vehicle 2.

At step S51, the detection unit 101 acquires the positional information history of the vehicle 2. The detection unit 101 can acquire the positional information history of the vehicle 2, by inquiring the on-vehicle terminal 20 or the vehicle management server 4, for example.

At step S52, the detection unit 101 acquires the positional information history of the terminals 3 of the users. The detection unit 101 can acquire the history of the positional information about the terminals 3, by inquiring the on-vehicle terminal 20 or the vehicle management server 4, for example.

At step S53, the detection unit 101 acquires the number of occupants, based on the number of the terminals 3 that are moving together with the vehicle 2. The detection unit 101 can use, as the number of occupants, the number of the terminals 3 that are present within a predetermined distance (e.g., within five meters) from the vehicle 2 for a predetermined time period or longer, for example. Note that, when the owners of the terminals 3 specified as the occupants have a family relationship, the detection unit 101 may exclude the owners of the terminals 3 having a family relationship from the number of occupants.

The process at step S54 and step S55 is identical to the process at step S13 and step S14 indicated in FIG. 4.

In the fourth modification, whether or not the vehicle 2 is under share ride is detected based on the positional information about the vehicle 2 and the terminals 3. The information processing device 1 can accurately detect whether or not the vehicle 2 is under share ride, by combining the detection method based on positional information with the detection methods of the first embodiment and the other modifications.

Other Embodiments

The embodiment described above is an example, and the present disclosure may be changed and carried out as appropriate without departing from the gist of the present disclosure.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device comprising:
a processor configured to:
  detect whether or not a vehicle that is about to use a facility is under share ride by a plurality of users, based on positional information about the vehicle and positional information about user terminals of the plurality of users; and
  permit the vehicle to use the facility or providing an economic merit associated with usage of the facility to the vehicle, when having detected that the vehicle is under share ride,
wherein the processor is configured to detect that the vehicle is under share ride, by transmitting different codes to the user terminals of the plurality of users and receiving a notification from a representative user terminal having received the codes.

2. The information processing device according to claim 1, wherein
upon receiving authentication information created based on the respective codes by the representative user terminal, the processor is configured to permit the vehicle to use the facility or provide the economic merit associated with usage of the facility to the vehicle.

3. An information processing method for causing a computer to execute:
detecting that a vehicle that is about to use a facility is under ride share by a plurality of users, based on positional information about the vehicle and positional information about user terminals of the plurality of users; and
permitting the vehicle to use the facility or providing an economic merit associated with usage of the facility to the vehicle,
wherein the computer is configured to detect that the vehicle is under share ride, by transmitting different codes to the user terminals of the plurality of users and receiving a notification from a representative user terminal having received the codes.

4. A non-transitory computer-readable medium storing a program for causing a computer to execute steps comprising:
detecting that a vehicle that is about to use a facility is under ride share by a plurality of users, based on positional information about the vehicle and positional information about user terminals of the plurality of users; and
permitting the vehicle to use the facility or providing an economic merit associated with usage of the facility to the vehicle,
wherein the computer is configured to detect that the vehicle is under share ride, by transmitting different codes to the user terminals of the plurality of users and receiving a notification from a representative user terminal having received the codes.

5. An information processing device comprising:
a processor configured to:
  detect whether or not a vehicle that is about to use a facility is under share ride by a plurality of users, by transmitting different codes to user terminals of the plurality of users and receiving a notification from a representative user terminal having received the codes; and
  permit the vehicle to use the facility or providing an economic merit associated with usage of the facility to the vehicle, when having detected that the vehicle is under share ride.

6. The information processing device according to claim 5, wherein
upon receiving authentication information created based on the respective codes by the representative user terminal, the processor is configured to permit the vehicle to use the facility or provide the economic merit associated with usage of the facility to the vehicle.

* * * * *